United States Patent [19]
Richardson

[11] Patent Number: 6,003,885
[45] Date of Patent: Dec. 21, 1999

[54] AXLE LIFT MECHANISM

[75] Inventor: Gregory A. Richardson, Muskegon, Mich.

[73] Assignee: Neway Anchorlok International, Inc., Muskegon, Mich.

[21] Appl. No.: 09/271,397

[22] Filed: Mar. 17, 1999

Related U.S. Application Data

[63] Continuation of application No. PCT/US97/17443, Sep. 30, 1997
[60] Provisional application No. 60/027,409, Sep. 30, 1996.

[51] Int. Cl.$^6$ ..................................................... B60G 1/00
[52] U.S. Cl. ........................................................... 280/86.5
[58] Field of Search ............................. 280/86.5; 180/209

[56] References Cited

U.S. PATENT DOCUMENTS

| | | |
|---|---|---|
| 3,340,946 | 9/1967 | Whitehead . |
| 3,771,812 | 11/1973 | Pierce et al. . |
| 4,497,507 | 2/1985 | Chervenak . |
| 4,634,141 | 1/1987 | Hagan et al. . |
| 5,058,916 | 10/1991 | Hicks ...................................... 280/704 |
| 5,588,665 | 12/1996 | Pierce et al. ............................ 280/704 |
| 5,868,418 | 2/1999 | VanDenberg ......................... 280/43.23 |

*Primary Examiner*—Lanna Mai
*Assistant Examiner*—Faye M. Fleming
*Attorney, Agent, or Firm*—Rader, Fishman, Grauer & McGarry, an Office of Rader, Fishman & Grauer PLLC

[57] ABSTRACT

A vehicle suspension comprising first and second arms mountable to a vehicle frame for vertical swinging movement adjacent opposite sides of the vehicle frame, each of which mounts an axle for rotatably supporting at least one ground-engaging wheel thereon. Air springs are mounted between the arms and the frame in load-transmitting relation therebetween. An improved axle lift mechanism for lifting the axles and the at least one wheel responsive to relief of air pressure in the air springs is provided which comprises first and second telescoping guide members mountable to the frame, each of which have a distal end adapted to be positioned adjacent opposing sides of the frame and being movable between a retracted position and an extended position. A first lever mechanism is adapted to be mounted to the frame, and is mounted to the distal end of the first telescoping guide member and to the first arm. A second lever mechanism is adapted to be mounted to the frame, and is mounted to the distal end of the second telescoping guide member and to the second arm. The arms are raised with respect to the frame when the first and second telescoping guide members move between the extended and the retracted positions. A spring is mounted to the first and second telescoping guide member to bias the first and second telescoping guide members into the retracted position.

18 Claims, 4 Drawing Sheets

AXLE LIFT MECHANISM

CROSS-REFERENCE TO RELATED APPLICATION

This application is a continuation of PCT International Application Number PCT/US97/17443 filed Sep. 30, 1997, which claims the benefit of U.S. Provisional Application Ser. No. 60/027,409, filed Sep. 30, 1996.

BACKGROUND OF THE INVENTION

1. Field of the Invention

This invention relates to axle lift mechanisms for load-carrying vehicles and, more particularly, to lift mechanisms for automatically raising an axle/wheel assembly so as to disengage the wheels from a ground surface.

2. Description of the Related Art

Several types of vehicles, including semi-trailer truck vehicles and the like, have multiple sets of axle/wheel assemblies arranged in tandem so as to adequately support relatively heavy loads. To adjust the load support provided by these tandem assemblies, it is known to employ suspension systems utilizing adjustably pressurized air springs and the like.

When the vehicle is carrying a relatively light load, it is desirable to relieve the load transmitting relationship between the vehicle and one or more of the axle/wheel assemblies, and also to disengage the axle/wheel assembly from ground contact so as to reduce tire wear. To relieve load support when an air suspension system is employed, air pressure in the suspension can be reduced. To achieve disengagement of the tires from the ground surface, devices commonly referred to as axle lift mechanisms can be employed. Prior lift mechanisms utilized stressed mechanical springs located adjacent each wheel which acted directly between a vehicle frame and the axle. When the downward load forces exerted on the axle by the suspension system were relieved, such as through deflation of air springs, lifting forces exerted by the mechanical springs pulled the axle upwardly to a raised position.

In addition to lifting a set of wheels from engagement with a ground surface, an additional function of the retractable suspension is to permit the utilization of the vehicle on a railway in addition to use on a highway. FIG. 1 illustrates a typical configuration of a trailer 10 having a suspension 12 in a retracted position, and mounted on a bogie 14 adapted for railroad use. The retractable suspension 12 serves to both lift the trailer 10 a sufficient distance to permit the rail bogie 14 or other support to be placed beneath the trailer and thereafter retract the wheels from the ground to permit the trailer 10 to rest and ride upon the bogie 14 or other support.

An example of one such axle lift mechanism is depicted in FIG. 2 and generally corresponds to the mechanism disclosed in U.S. Pat. No. 3,771,812 to Pierce et al., issued Nov. 13, 1973 which is incorporated herein by reference. Referring to FIG. 2, a first prior art axle lift mechanism 16 is used with a vehicle having a wheel 18 mounted to an axle 20. The axle 20 is connected to a trailing arm 22 through a conventional U-bolt 24 and nuts 26. The trailing arm 22 is pivotably mounted through a pivot connection 28 to a bracket 30 rigidly secured to a vehicle frame 32. The opposing end of the trailing arm 22 is secured to a conventional air spring 34 mounted to the vehicle frame 32 through bracket 36.

When the air spring 34 is inflated, load from the vehicle is transmitted through the vehicle frame 32 to the trailing arm 22. The force exerted by the air pressure in air spring 34 pivots the trailing arm 22 through the pivot connection 28 so that wheel 18 engages the ground surface.

The first prior art axle lift mechanism 16 includes a lever arm 38 mounted to the vehicle frame 32 through a pivot connection 40. One end of a coil spring 42 is connected to the lever arm 38 above the pivot connection 40 with an opposing end of the spring 42 secured to the vehicle frame 32 by an adjustable connection 44. The axle lift mechanism 16 also includes a chain 46 having an upper end secured to lever arm 38 through a bolt 48 and a lower end secured to the axle 20 through a lug 50.

When the vehicle is carrying a relatively light load, it is desirable to disengage the wheel 18 from a ground surface. Accordingly, air pressure in the air spring 34 is decreased and the load forces normally exerted on the trailing arm 22 by vehicle frame 32 are correspondingly relieved. With the load forces on trailing arm 22 relieved, the tension of coil spring 42 rotates lever arm 38 in a counterclockwise direction. Correspondingly, link chain 46 lifts the wheel 18 and axle 20 to an appropriately raised position as shown in dotted line format in FIG. 2.

A second prior art axle lift mechanism 60 is shown in FIG. 3 and disclosed in U.S. Pat. No. 4,634,141 which is incorporated herein by reference. Lift mechanism 60 is used with a trailing arm 62 pivotably mounted at one end to a bracket 66 through pivot connection 64. Bracket 66 is rigidly secured to a vehicle frame 68. Although not shown in FIG. 3, the trailing arm 62 can also be connected to a vehicle axle and releasably coupled in a load supporting relationship to the vehicle frame 68 through an air suspension system in a manner similar to trailing arm 22 depicted in FIG. 2.

The lift mechanism 60 includes a lever arm 70 having its lower end coupled to the vehicle frame 68 through a pivot connection 72. A rigid bar 74 is pivotably coupled at one end to a top portion of the lever arm 70 in an over center arrangement through pivot connection 76. An opposing end of rigid bar 74 is received through an aperture of a spring cup 78 and secured thereto with a fastener 80.

The spring cup 78 and rigid bar 74 are mounted within a tubular housing 82 shown in sectional configuration in FIG. 3. A spring 84 is mounted within the housing 82 and has one end which bears against spring cup 78 and an opposite end which bears against a stationary lip 86 of housing 82.

A link 88 is also coupled to lever arm 70 and rigid bar 74 at the pivot connection 76 which is correspondingly connected to a clevis link 90 and lifting chain 92 comprising a series of links 94. The lifting chain 92 is connected at its lower end to the trailing arm 62 through an anchor 96.

The operation of the second prior art axle lift mechanism 60 is similar to the operation of the lift mechanism 16 previously described with respect to FIG. 2. That is, with the air spring (not shown) in a deflated state, the lift mechanism 60 will operate to lift the trailing arm 62 and interconnected axle and wheels. The lifting force is provided by forces exerted by the compression spring 84 bearing against the spring cup 78. The forces exerted on the spring cup 78 are translated through the rigid bar 74 to rotate the lever arm 70 through pivot connection 72. Rotation of lever arm 70 correspondingly exerts lifting forces on trailing arm 62 through bar link 88, clevis link 90 and lifting chain 92.

FIG. 4 shows a third embodiment of a prior art axle lift mechanism 100 also disclosed in U.S. Pat. No. 4,634,141 which is used on a vehicle having a normally lowered axle/wheel assembly to automatically lift and maintain the assembly in a raised position when the vehicle is not heavily loaded. A trailing arm 102 is connected to a vehicle axle (not shown) and an air spring (not shown). The trailing arm 102 is pivotably coupled at one end to a vehicle frame 104. The lift mechanism 100 includes a flexible strap 106 secured at one end to the trailing arm 102 and wound around a pivotable cam 108. The opposite end of the strap 106 is coupled to a rod 110 adjustably engaged with a spring cup 112. A tapered coil spring 114 which is coaxial with the rod 110 bears against the spring cup 112 and exerts forces on the rod 110 and strap 106 sufficient to rotate the cam 108 and lift the trailing arm 102 and axle (not shown) to a raised position when the pressure in the air spring (not shown) is relieved.

The flexible strap 106 acts as a cam linkage which operatively connects the coil spring 114 and the trailing arm 102. The flexible strap 106 is connected so that forces exerted by the coil spring 114 are translated coaxially through the flexible strap 106 to lift the trailing arm 102.

In prior art axle lift mechanisms disclosed in FIGS. 2–4, a spring mechanism is required to be located adjacent each wheel on each side of the axle in each suspension which requires the use of more than one spring and its associated components for each suspension. These additional components add materials cost and additional weight to the vehicle.

SUMMARY OF THE INVENTION

According to the invention, a vehicle suspension comprises first and second arms mountable to a vehicle frame for vertical swinging movement adjacent opposite sides of the vehicle frame, each of which mounts an axle for rotatably supporting at least one ground-engaging wheel thereon. Air springs are mounted between the arms and the frame in load-transmitting relation therebetween. An improved axle lift mechanism for lifting the axles and the at least one wheel responsive to relief of air pressure in the air springs comprises first and second telescoping guide members mountable to the frame. Each of the telescoping guide members has a distal end adapted to be positioned adjacent opposing sides of the frame and is axially movable with respect to the other telescoping guide member between a retracted position and an extended position. A first lever mechanism is adapted to be mounted to the frame and is mounted to the distal end of the first telescoping guide member and to the first arm. A second lever mechanism is adapted to be mounted to the frame and is mounted to the distal end of the second telescoping guide member and to the second arm. The arms are raised with respect to the frame when the first and second telescoping guide members move from the extended to the retracted positions. A spring is mounted between the first and second telescoping guide member to bias the first and second telescoping guide members into the retracted position.

The first telescoping guide member preferably comprises a shaft having a first end with a radially-extending plate and a second end with a clevis. The second guide member preferably comprises a plate having at least two spaced shafts extending therefrom. The shaft on the first telescoping guide member is preferably located between the at least two spaced shafts of the second telescoping guide member. The spring preferably comprises a coil spring.

The vehicle suspension can further comprise a first spring retainer plate mounted to a proximal end of the first telescoping guide member and a second spring retainer plate mounted to a proximal end of the second telescoping guide member. The spring is further mounted between the first and second spring retainer plates to bias the first and second telescoping members into the retracted position. Each of the first and second lever mechanisms of the vehicle preferably includes a flexible linkage attached to the respective first and second arms. Each lever mechanism further includes a first link pivotally mounted at one end to the distal end of a respective telescoping guide member and mountable to the frame at an opposite end. Each lever mechanism further includes a second link pivotably mounted at one end to the distal end of a respective telescoping guide member and mounted at an opposite end to the flexible linkage. The first links are preferably adapted to maintain the first and second telescoping guide members in a generally horizontal orientation.

In another embodiment, the invention relates to a vehicle body which comprises a frame having opposing longitudinal sides. First and second arms are mounted to the frame for vertical swinging movement adjacent the longitudinal sides of the frame. Each arm mounts an axle for rotatably supporting at least one ground-engaging wheel thereon, and air springs are mounted in load-transmitting relationship between the arms and the frame. An improved axle lift mechanism for lifting the axles and the at least one wheel responsive to relief of air pressure in the air springs comprises first and second telescoping guide members mounted to the frame transverse to a longitudinal side of the frame. Each of the first and second telescoping members has a distal end positioned adjacent the longitudinal sides of the frame. The first and second telescoping members are axially movable with respect to each other between a retracted position and an extended position. A first lever mechanism is pivotally mounted to the frame, and mounted to the distal end of the first telescoping guide member and to the first arm. A second lever mechanism is pivotally mounted to the frame, and mounted to the distal end of the second telescoping guide member and to the second arm. The arms are raised with respect to the frame when the first and second telescoping guide members move from the extended to the retracted positions. A spring is preferably mounted between the first telescoping guide member and the second telescoping guide member to bias the first and second telescoping guide members into the retracted position.

BRIEF DESCRIPTION OF THE DRAWINGS

The invention will now be described with reference to the drawings in which.

DETAILED DESCRIPTION OF THE PREFERRED EMBODIMENTS

Figure 5:
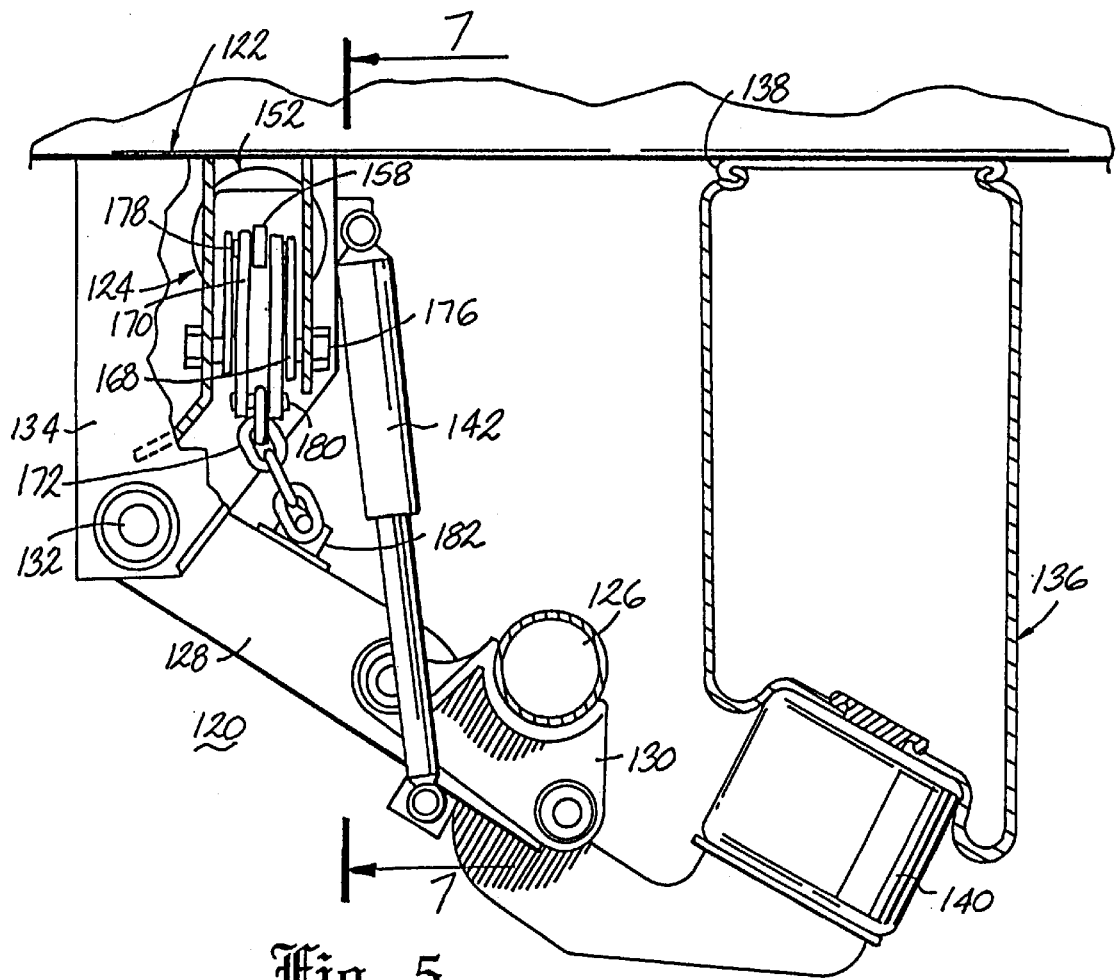
FIG. 5 is a side elevational view in section of an axle lift mechanism in a fully extended position according to the invention wherein any supported wheels engage a ground surface.
Figure 6:
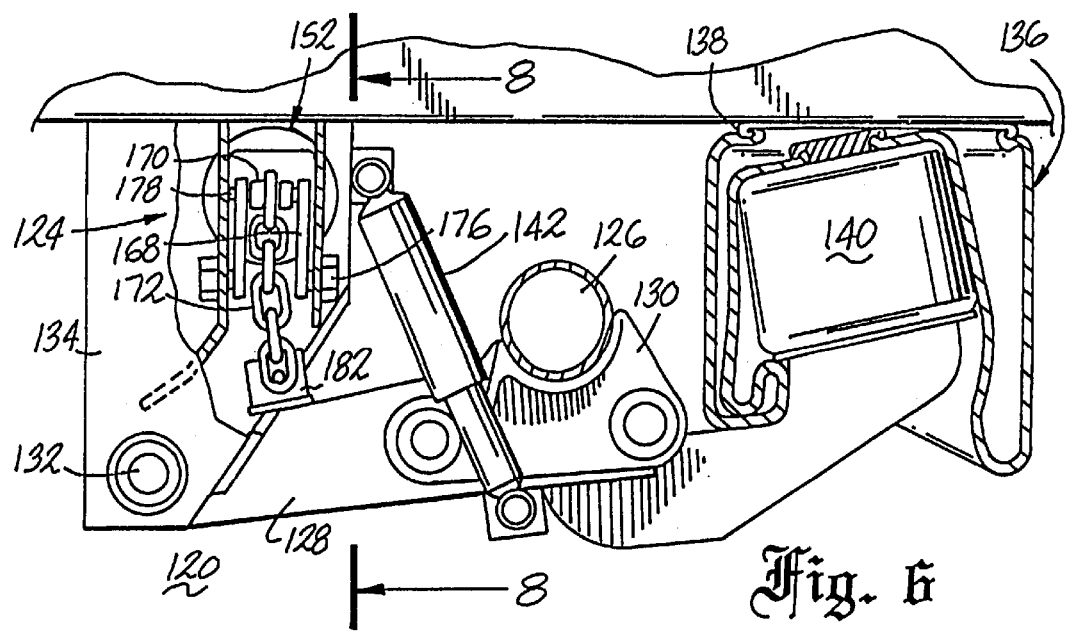
FIG. 6 is a side view in section of the axle lift mechanism of FIG. 5 in a retracted position wherein any supported wheels are suspended above the ground surface.

Referring now to FIGS. 5 and 6, there is shown a suspension system 120 constructed substantially in accordance with the principles of the invention. The suspension 120 is mounted beneath a vehicle frame 122 and supports ground-engaging wheels (not shown). The suspension 120 is further adapted to be movable between an extended position (FIG. 5), whereby the wheels engage a ground surface and a retracted position (FIG. 6) whereby the wheels are lifted off of the ground surface. An axle lift mechanism 124 is used with a vehicle having a wheel (not shown) mounted to an axle 126. The axle 126 is connected to a trailing arm 128 through a conventional U-shaped bracket 130. The trailing arm 128 is pivotably mounted through a pivot connection 132 to a bracket 134 rigidly secured to the vehicle frame 122. The opposite end of the trailing arm 128 is secured to a conventional air spring 136 having a rolling lobe configuration mounted to the vehicle frame 122 through a mounting flange 138.

The air spring 136 can include a piston element 140 directly mounted to the trailing arm 128 and extending inwardly into the rolling lobe. When the air spring 136 is inflated, load from the vehicle is transmitted through the vehicle frame 122 to the trailing arm 128. The force exerted by the air pressure in air spring 136 pivots the trailing arm 128 through the pivot connection 132 so that the wheel engages the ground surface.

A conventional shock absorber 142 can also be pivotably mounted to the trailing arm 128 and the bracket 134.

Figure 8:
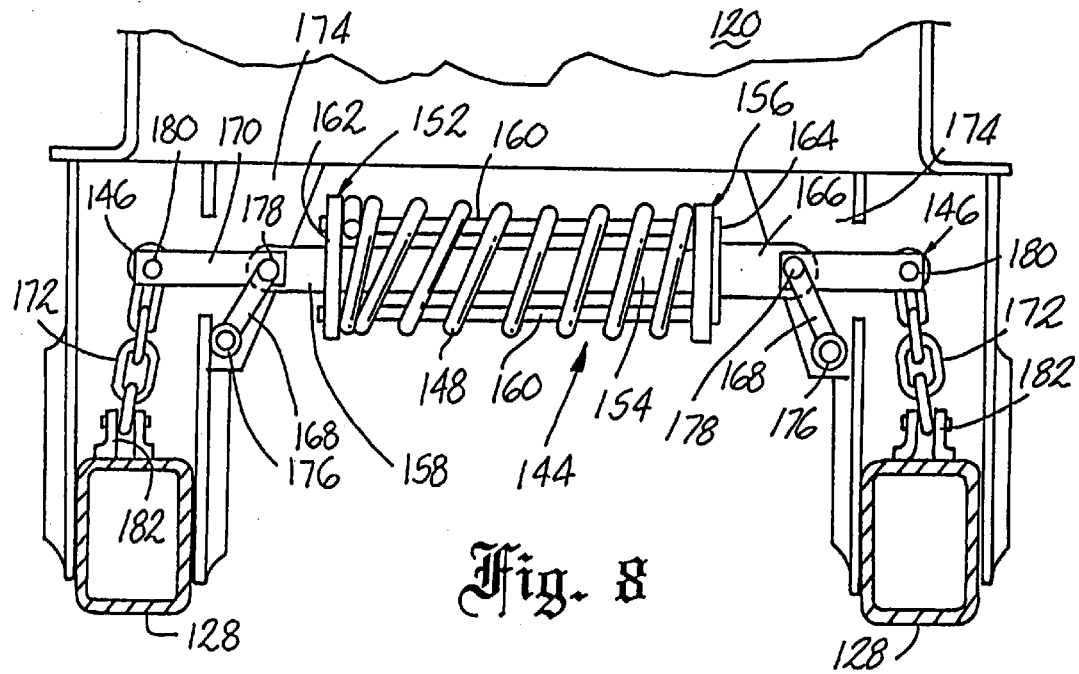
FIG. 8 is a rear view in section of the axle lift mechanism taken along lines 8—8 of FIG.6.
Figure 7:
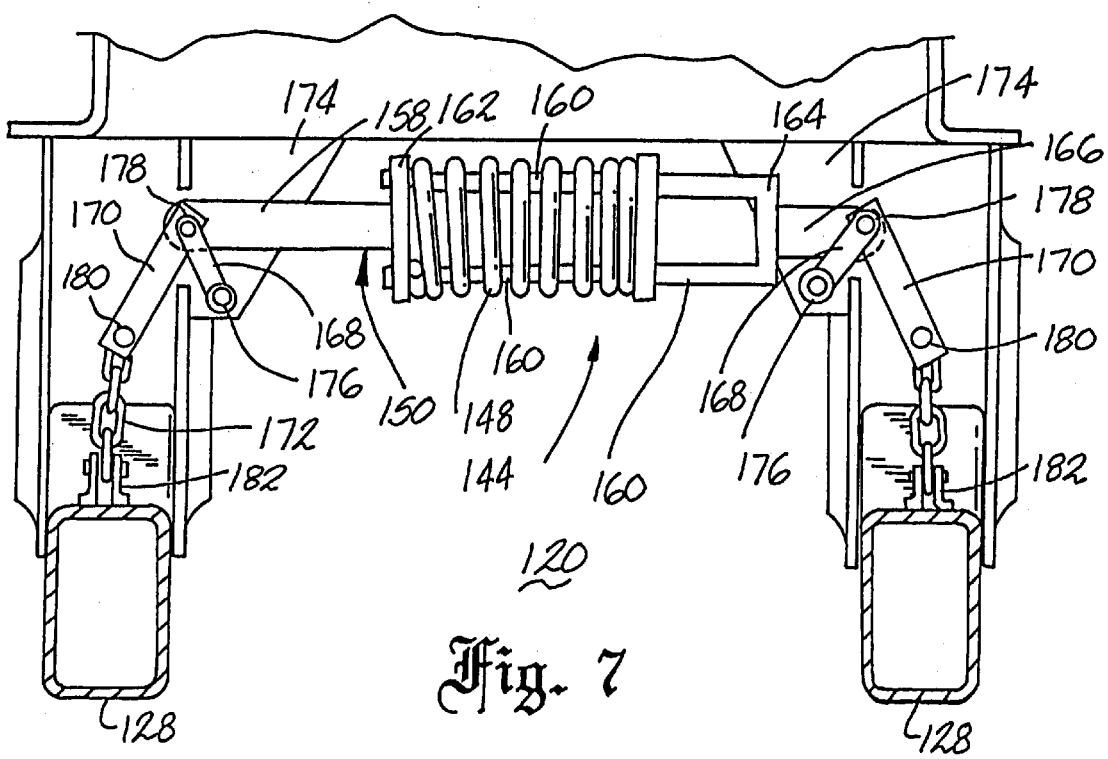
FIG. 7 is a rear view in section of the axle lift mechanism taken along lines 7—7 of FIG.5.

As shown in FIGS. 5–6 and in greater detail in FIGS. 7–8, the axle lift mechanism according to the invention comprises a spring mechanism 144 and a lever mechanism 146 mounted to either side of the spring mechanism 144. Each lever mechanism 146 transmits linear motion from the spring mechanism 144 into lifting motion to each corresponding trailing arm 128.

The spring mechanism 144 comprises a coil spring 148 disposed between first and second telescopically-arranged guide members 150 and 152. The first guide member 150 comprises a cylindrical shaft 154 having a first end provided with a radially-extending plate 156 and a second end provided with an axially-extending clevis 158. The second guide member 152 comprises at least two spaced cylindrical shafts 160 each having a first end fixedly mounted to a circular plate 162.

The coil spring 148 is disposed over the shafts 160 so that one end of the spring 148 abuts an interior surface of the plate 162. The interior surface of the plate 162 can be provided with a curled lip to increase the retention of the spring 148 thereagainst. Each second end of each shaft 160 extends through corresponding apertures in the plate 156 so that the spring 148 is retained between the interior surfaces of the plates 156 and 162. The ends of the shafts 160 extending beyond the plate 156 are interconnected by a flange 164 which includes an axially-extending clevis 166.

The lever mechanisms 146 are mounted between either side of the spring mechanism 144 and each trailing arm 128 and convert linear motion from the spring mechanism 144 into lifting motion to each of the trailing arms 128. It will be understood that each lever mechanism 146 includes the same components and are referred to by identical reference numerals.

The lever mechanism 146 comprises a first link 168, a second link 170 and a chain 172. The first link 168 has a first end pivotably mounted to a lower portion of an inwardly-extending flange 174 of the bracket 134 by a conventional pivotable connection 176. An opposite end of the first link 168 is mounted to a first end of the second link 170 and a clevis of the spring mechanism 144 by another conventional pivotable connection 178. An opposite end of the second link 170 is mounted to a first end of the chain 172 by a conventional pivotable connection 180. The opposite end of the chain 172 is mounted to the trailing arm 128 by a conventional pivotable connection 182.

When the lever mechanisms 146 are mounted between the spring mechanism 144 and the trailing arms 128, the spring mechanism 144 is suspended beneath the vehicle frame 122 between the trailing arms 128.

When the vehicle is carrying a relatively light load, it is desirable to disengage one or more of the wheels from a ground surface. Accordingly, air pressure in the air spring 136 is decreased and the load forces normally exerted on the trailing arm 128 by the vehicle frame 122 are correspondingly relieved. With the load forces on the trailing arm 128 relieved, the tension of the coil spring 148 in the spring mechanism 144 rotates each first link 168 in an inward direction. Correspondingly, the chains 172 lift the wheels and axle 126 to an appropriately raised position. In the raised position, the top of the piston element 140 of air spring 136 bears against a bumper or stop on the mounting flange 138 and provides a limitation to upward movement.

The aforementioned axle lift mechanism 124 is advantageous over previously designed lifting mechanisms in that the lifting of the axle 126 is accomplished by a single spring 148 which simultaneously lifts both trailing arms 128 on either side of the trailer 10. The flexibility of the lifting chain 172 is advantageous over rigid links between the second link 170 and the trailing arm 128 in that alignment problems do not result in severe defects in operation. In addition, a rigid linking structure is subject to permanent deformation if it sustains a sharp blow or the like.

When the axle is in the raised position, elements of the axle lift mechanism 124 will be in the positions shown in FIGS. 6 and 8. When the axle is in the lowered position, the elements of the axle lift mechanism 124 will have the relative positions shown in FIGS. 5 and 7.

When the axle is in the lowered position, and it is desired to lift the axle to the raised position, air pressure in the previously described air spring 136 can be decreased so as to relieve vehicle load from the trailing arm 128. When the vehicle load is relieved, the only forces exerted downwardly on the chain 172 through the second links 170 will be the weight of the trailing arm 128 and the axle 126. Lifting forces will be exerted on the trailing arm 128 by the spring 148 acting through the second link 170. That is, spring 148, being in a compressed state, will exert opposing forces on the plates 156 and 162 so as to axially retract each clevis 158 and 166 inwardly.

With the first link 168 pivotable through connection 176 and the dual pivotable connection of the first and second links 168 and 170 to each clevis, the first link 168 will be rotated inwardly. Inward rotation of each first link 168 will exert lifting forces on the chain 172 through the second link 170. As the first link 168 rotates towards the retracted position, the first link 168 therefore acts as a lever to convert linear motion imparted to each clevis 158 and 166 by the action of the spring 148 to upward lifting forces at the connection 182 of the chain 172 to the trailing arm 128. Accordingly, the trailing arm 128 and interconnected wheel/axle assembly (not shown) are lifted toward a retracted position so that the wheels are disengaged from a ground surface. It should be noted that the first and second guide members 150 and 152 maintain a substantially coaxial relationship to each other which prevents binding and/or failure.

When it is desired to transmit vehicle load to the wheel/axle assembly, the previously described air spring 136 can be inflated so as to exert downward forces on the end of trailing arm 128 opposing the pivot connection 132. With the downwardly exerted forces exerted on trailing arm 128 sufficient to overcome the lifting forces exerted by the coil spring 148 through the lever mechanisms 146, the first links 168 will rotate through the pivotable connection 176 in an outward direction as viewed in FIGS. 5 and 7. As the first link 168 rotates, the linear distance between the plates 156 and 162 decreases. With the first link 168 rotating in an outward direction, outward axial motion is imparted to each clevis 158 and 166 through the chain 172 and second link 170. These forces are correspondingly exerted on the plates 156 and 162 in a direction opposing forces exerted by the spring 148.

As the plates 156 and 162 are pulled closer together, the coil spring 148 is increasingly loaded and exerts increasing forces against the plates 156 and 162 opposing movement. As the coil spring 148 is increasingly compressed as the first link 168 rotates outwardly, the opposing forces exerted on each clevis 158 and 166 through the second links 170 will correspondingly increase.

By maintaining the forces acting through the spring mechanism 144 substantially coaxial, relative friction between the components therein is minimized. In addition, with only a single spring mechanism 144 constructed as described herein, manufacturing costs are relatively less expensive and weight savings are provided. It will be apparent to those skilled in the pertinent arts that other embodiments of an axle lift mechanism in accordance with the invention can be designed. That is, the principles of an axle lift mechanism are not limited to the specific embodiment described herein.

Figure 1:
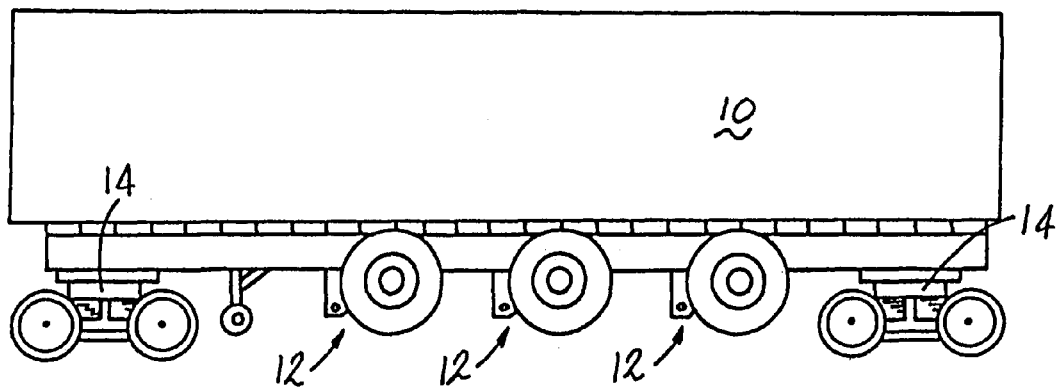
FIG. 1 is a side elevational view of a known trailer/bogie assembly.
Figure 2:
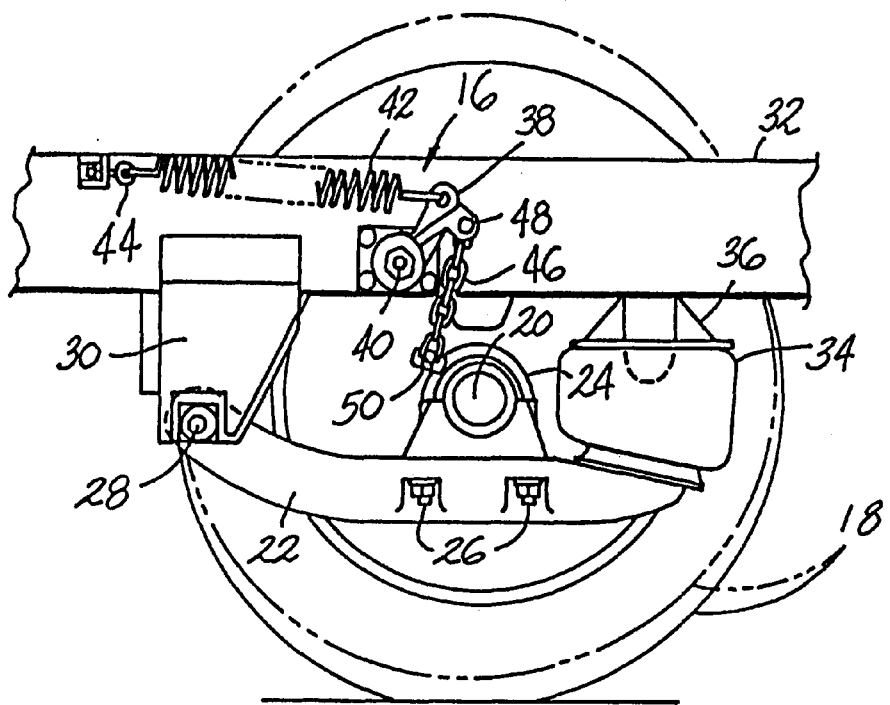
FIG. 2 is a side elevational view in section of a first prior art axle lift mechanism.
Figure 3:
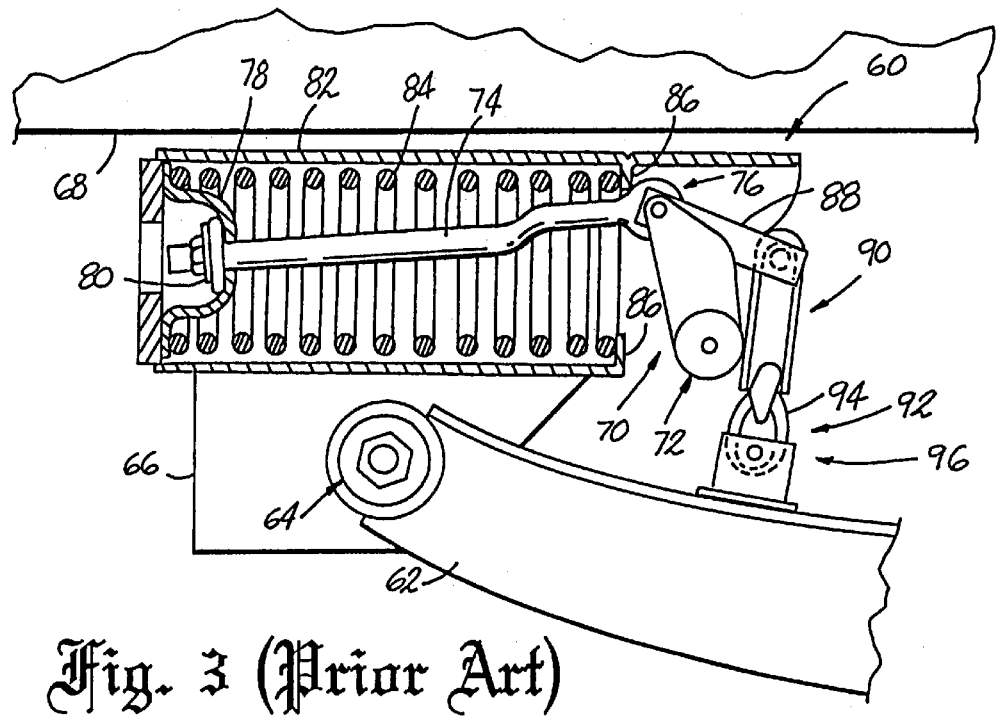
FIG. 3 is a side elevational view in section of a second prior art axle lift mechanism.
Figure 4:
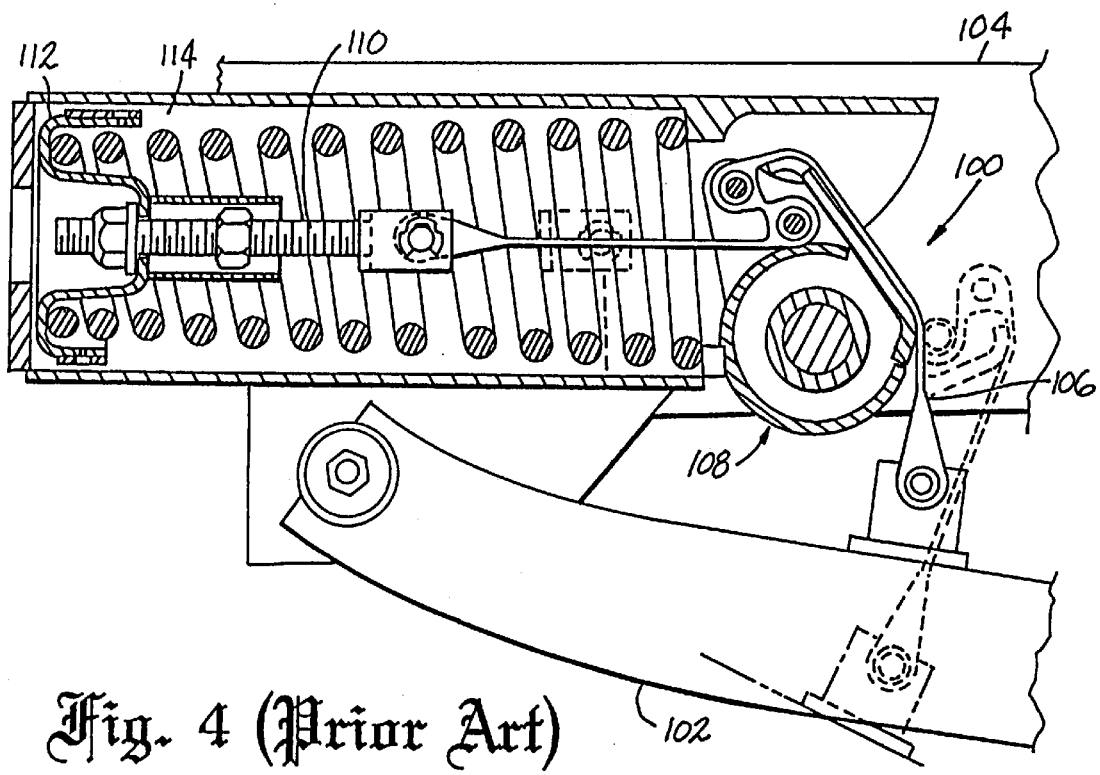
FIG. 4 is a side elevational view in section of a third prior art axle lift mechanism.

The suspension system illustrated in FIGS. 5–8 can be used in connection with a rail car to support the trailer which mounts the suspension as shown in FIG. 1. In this type of suspension, the trailer needs to be lifted to roll the rail carriage beneath the trailer. The position of the suspension shown in FIGS. 5 and 7 show the suspension in a maximum extended position. Ordinarily, when the suspension is in normal use on a highway, the axle will be in a position intermediate the positions shown in FIGS. 5 and 6.

Reasonable variation and modification are possible within the spirit of the foregoing specification and drawings without departing from the scope of the invention.

The embodiments for which an exclusive property or privilege is claimed are defined as follows:

1. A vehicle suspension comprising first and second arms mountable to a vehicle frame for vertical swinging movement adjacent opposite sides of the vehicle frame, each arm mounting an axle for rotatably supporting at least one ground-engaging wheel thereon, and air springs mounted to the arms and mountable to the frame in load-transmitting relation between the arms and the frame, an improved axle lift mechanism for lifting the axle and the at least one wheel responsive to relief of air pressure in the air springs which comprises:

first and second telescoping guide members mountable to the frame transverse to a longitudinal axis of the frame, each of the first and second telescoping members having a distal end adapted to be positioned adjacent one of the opposite sides of the frame, the first and second telescoping members being axially movable with respect to each other between a retracted position and an extended position;

a first lever mechanism adapted to be pivotally mounted to the frame, and mounted to the distal end of the first telescoping guide member and to the first arm;

a second lever mechanism adapted to be pivotally mounted to the frame, and mounted to the distal end of the second telescoping guide member and to the second arm;

wherein the arms are raised with respect to the frame when the first and second telescoping guide members move from the extended to the retracted positions; and a spring mounted between the first telescoping guide member and the second telescoping guide member to bias the first and second telescoping guide members into the retracted position.

2. The vehicle suspension of claim 1 wherein the first telescoping guide member comprises a shaft having a first end with a radially-extending plate and a second end with a clevis; and the second guide member comprises a plate having at least two spaced shafts extending therefrom.

3. The vehicle suspension of claim 2 wherein the shaft on the first telescoping guide member is located between the at least two spaced shafts of the second telescoping guide member.

4. The vehicle suspension of claim 3 wherein the spring comprises a coil spring.

5. The vehicle suspension of claim 4 wherein the spring is mounted between the first and second telescoping members to bias them into the retracted position.

6. The vehicle suspension of claim 1 wherein each of the first and second lever mechanisms includes a flexible linkage attached to the respective first and second arms.

7. The vehicle suspension of claim 6 wherein each lever mechanism further includes a first link pivotally mounted at one end to the distal end of a respective telescoping guide member and mountable to the frame at an opposite end.

8. The vehicle suspension of claim 7 wherein each lever mechanism further includes a second link pivotably mounted at one end to the distal end of a respective telescoping guide member and mounted at an opposite end to the flexible linkage.

9. The vehicle suspension of claim 7 wherein the first links are adapted to maintain the first and second telescoping guide members in a generally horizontal orientation.

10. A vehicle body comprising a frame having opposing longitudinal sides, first and second arms mounted to the frame for vertical swinging movement adjacent the longitudinal sides of the frame, each arm mounting an axle for rotatably supporting at least one ground-engaging wheel thereon, and air springs mounted to the arms and to the frame in load-transmitting relation between the arms and the frame, an improved axle lift mechanism for lifting the axle and the at least one wheel responsive to relief of air pressure in the air springs which comprises:

first and second telescoping guide members mounted to the frame transverse to a longitudinal side of the frame, each of the first and second telescoping guide members having a distal end positioned adjacent one of the longitudinal sides of the frame, the first and second telescoping members being axially movable with respect to each other between a retracted position and an extended position;

a first lever mechanism pivotally mounted to the frame, and mounted to the distal end of the first telescoping guide member and to the first arm;

a second lever mechanism pivotally mounted to the frame, and mounted to the distal end of the second telescoping guide member and to the second arm;

wherein the arms are raised with respect to the frame when the first and second telescoping guide members move from the extended to the retracted positions; and a spring mounted between the first telescoping guide member and the second telescoping guide member to bias the first and second telescoping guide members into the retracted position.

11. The vehicle body of claim 10 wherein the first telescoping guide member comprises a shaft having a first end with a radially-extending plate and a second end with a clevis; and the second guide member comprises a plate having at least two spaced shafts extending therefrom.

12. The vehicle body of claim 11 wherein the shaft on the first telescoping guide member is located between the at least two spaced shafts of the second telescoping guide member.

13. The vehicle body of claim 12 wherein the spring comprises a coil spring.

14. The vehicle body of claim 13 wherein the spring is mounted between the first and second telescoping members to bias them into the retracted position.

15. The vehicle body of claim 10 wherein each of the first and second lever mechanisms includes a flexible linkage attached to the respective first and second arms.

16. The vehicle body of claim 15 wherein each lever mechanism further includes a first link pivotally mounted at one end to the distal end of a respective telescoping guide member and pivotally mounted to the frame at an opposite end.

17. The vehicle body of claim 16 wherein each lever mechanism further includes a second link pivotally mounted at one end to the distal end of a respective telescoping guide member and mounted at an opposite end to the flexible linkage.

18. The vehicle body of claim 16 wherein the first links maintain the first and second telescoping guide members in a generally horizontal orientation.

* * * * *